United States Patent [19]

Nozawa et al.

[11] 3,899,420
[45] Aug. 12, 1975

[54] STEAM REFORMER FOR HYDROCARBONS

[75] Inventors: Masao Nozawa; Takehiko Yasuno; Takashi Yamaguchi, Tokyo; Hiroshi Uenoyama, Yokohama, all of Japan

[73] Assignees: Japan Atomic Energy Research Institute; Japan Gasoline Co., Ltd., both of Tokyo, Japan

[22] Filed: Mar. 24, 1972

[21] Appl. No.: 237,865

[30] Foreign Application Priority Data
Mar. 27, 1971 Japan.............................. 46-18136

[52] U.S. Cl. ................. 196/129; 196/133; 23/289; 23/288 M; 23/288 K
[51] Int. Cl.............................................. C12k 1/10
[58] Field of Search ......... 23/288 H, 288 M, 288 K, 23/289; 196/110, 119, 120, 129, 133, 155; 48/197, 105, 94

[56] References Cited
UNITED STATES PATENTS

| | | | |
|---|---|---|---|
| 2,709,496 | 5/1955 | Baker.................................. | 23/289 |
| 2,813,779 | 11/1957 | Faatz................................. | 23/288 M |
| 3,127,248 | 3/1964 | Koniewiez........................... | 23/288 |
| 3,129,065 | 4/1964 | Koniewiez.......................... | 23/288 M |
| 3,424,695 | 1/1969 | Wiesenthal......................... | 23/288 M |
| 3,607,125 | 9/1971 | Kydd................................. | 23/288 M |
| 3,656,913 | 4/1972 | Blaha................................ | 23/288 M |

*Primary Examiner*—Wilbur L. Bascomb, Jr.
*Assistant Examiner*—Hiram H. Bernstein
*Attorney, Agent, or Firm*—Woodhams, Blanchard and Flynn

[57] ABSTRACT

A steam reformer provided with a plurality of double-tube type reforming tubes fixed vertically and in gas-tight fashion on a tube sheet which divides a cylindrical vessel into the upper pressure vessel and the lower pressure-vessel, wherein a mixture of hydrocarbons and steam is introduced from the upper pressure-vessel into the reforming tubes and the steam-reforming reaction is effected within the lower pressure-vessel by the use of a high-temperature and high-pressure helium gas as the heat-source.

6 Claims, 4 Drawing Figures

STEAM REFORMER FOR HYDROCARBONS

BACKGROUND OF THE INVENTION a. Field of the invention

The present invention relates to a steam reformer for the purpose of effecting the steam-reforming reaction of hydrocarbons by applying a high-temperature and high-pressure helium gas as the heat-source.

b. Description of the prior art

The process of manufacturing hydrogen, methanol synthesis gas, oxo synthesis gas, ammonia synthesis gas, etc. by catalytically steam-reforming hydrocarbons has heretofore been popular in the chemical industry, and there are various types of steam reformers for use in this process. As for the steam reformer prevalent for industrial use at present, however, one applying heat through combustion of the so-called fossil fuel, namely, natural gas, refinery gas, naphtha, etc. by means of a burner has been dominant. And, inasmuch as the steam-reforming reaction of hydrocarbons is an intense endothermic reaction, the fuel expense accounts for a considerable percentage of the manufacturing cost of the product gas.

In the meantime, there has recently been progress in the technical development of the high-temperature gas cooled reactor employing helium as the coolant in the field of nuclear power reactors. In case of such a reactor, the temperature of helium at the outlet of the reactor is supposed to be in the range of 750°–850°C, and, subject to future development, it is considered feasible to raise it up to 1,000°C or thereabout. Therefore, the question of how to utilize this high-temperature heat energy efficiently has become worthy of attention. Especially, the conception of applying the nuclear heat energy of the high-temperature gas cooled reactor to the steam-reforming reaction of hydrocarbons through the medium of helium gas has recently been examined as a link in the chain of the atomic-power iron manufacturing process. However, it must be taken into consideration that the high-temperature and high-pressure helium gas obtained from an ordinary high-temperature gas cooled reactor will contain some nuclear fission product arising from the nuclear fuel though its quantity may be trifling. From this point of view, there has not yet been developed any steam reformer having a concrete structure capable of effectively utilizing the heat energy of said helium gas in due consideration of the security in this respect. The present invention is to provide a steam reformer which renders it possible to effect the steam-reforming of hydrocarbons smoothly through effective utilization of the heat-energy of a high-temperature and high-pressure helium gas obtained from a high-temperature gas cooled reactor.

SUMMARY OF THE INVENTION

The steam reformer according to the present invention features the construction wherein: a plurality of reforming tubes are fixed vertically and in gastight fashion on a tube sheet which divides a cylindrical vessel into an upper pressure-vessel and a lower pressure-vessel; said upper pressure-vessel is so devised that a mixture of hydrocarbons and steam is introduced into said reforming tube therein; the reforming tube is of double-tube type so as to make said mixture of hydrocarbons and steam descend through a steam-reforming catalyst zone packed between the outer tube and the inner tube and ascend inside the inner tube; said lower pressure-vessel is so devised that heating is effected therein by the use of a high-temperature and high-pressure helium gas, whereby the mixture undergoes the steam-reforming reaction and the resulting product gas is taken out of said upper pressure-vessel; and further said upper pressure-vessel and lower pressure-vessel are maintained to have substantially uniform pressure.

The hydrocarbon to be subjected to steam-reforming reaction according to the present invention includes such hydrocarbons as natural gas, butane, naphtha, etc. The temperature of helium gas to serve as the heat-source is in the range of about 750°–1,100°C, and the applicable pressure is in the range of about 20–60 kg/cm$^2$. According to the present invention, it is possible to utilize directly the helium gas flowing from the reactor core of the high-temperature gas cooled reactor as primary coolant.

DESCRIPTION OF THE ACCOMPANYING DRAWINGS

FIG. 1 is a diagrammatic cross-sectional view of a steam reformer according to the present invention, FIG. 2 is a diagrammatic cross-sectional view of the reforming tube accommodated in the steam reformer shown in FIG. 1, FIG. 3 is a diagrammatic cross-sectional view of another steam reformer according to the present invention as taken of its part below the tube sheet, and FIG. 4 is a diagrammatic horizontal cross section of FIG. 3.

DESCRIPTION OF THE PREFERRED EMBODIMENTS

Hereunder will be given a further elucidation of the present invention by reference to the accompanying drawings.

Figure 1:
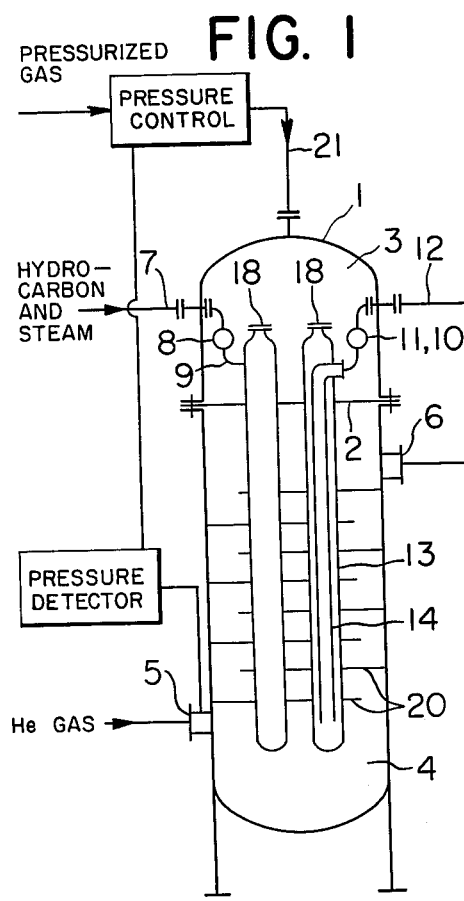
Figure 2:
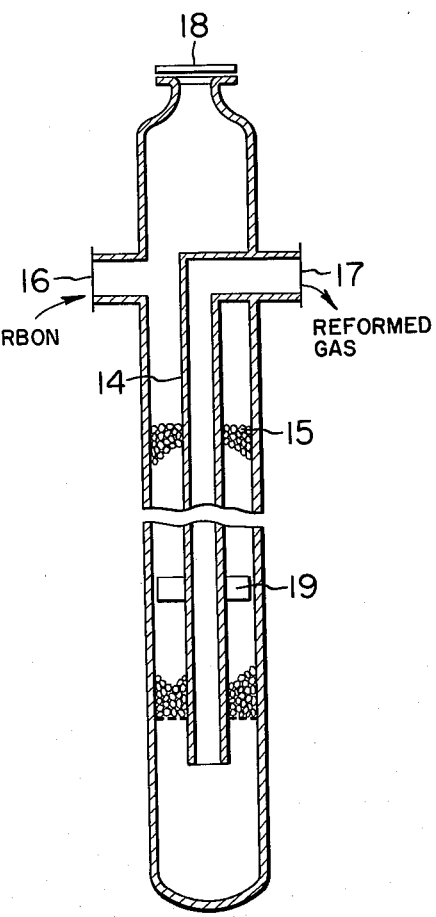

In FIG. 1, the numeral reference 1 denotes the steam reformer. This reformer is gastightly divided into the upper pressure-vessel 3 and the lower pressure-vessel 4 by means of the tube sheet 2. Helium gas with a high temperature ranging from 750° to 1,100°C and a high pressure ranging from 20 kg/cm$^2$ to 60 kg/cm$^2$ is introduced into said lower pressure-vessel through the nozzle 5 to heat the reforming tube 13 and to go out through the nozzle 6. As the high-temperature and high-pressure helium gas to heat the reforming tube 13 is a monoatomic gas and is hardly possessed of emissivity, the convective heat transfer constitutes the principal mode of heat transmission, and, therefore, in order to enhance the heat transfer coefficient of the side of reforming tube coming in contact with helium, there are provided the baffle plates 20 so as to form a passage which leads the high-temperature and high-pressure helium upwards from the lower part of the lower pressure-vessel of the reformer and intersects with the group of reforming tubes.

Meanwhile, an adequately preheated mixture of hydrocarbons and steam is introduced via line 7 into the inlet header 8 within the upper pressure-vessel 3 of the reformer 1 and is subsequently introduced uniformly into the plural reforming tubes 13 installed vertically on the tube sheet 2 through the distribution pipe 9. The number of said reforming tubes is optionally determined according to the capacity of the reformer. This reforming tube penetrates the tube sheet 2 and is gastightly fixed to the tube sheet by welding and the like. And, even when the reforming tube is 10 meters or thereabout in length as conventional and is vulnerable to lateral external force notwithstanding the support by the tube sheet, it is strengthened by means of the baffle plates 20 provided for the reforming tube in several places.

The reforming tube is of double-tube structure consisting of the outer tube 13 and the inner tube 14. In the space between the inner and outer tubes, there is installed the inner tube support 19 and is packed the catalyst 15. The catalyst thus packed suffices to be a conventional catalyst for use in effecting the steam-reforming reaction of hydrocarbon, such as nickel catalyst. The mixture of hydrocarbons and steam enters the reforming tube through the inlet nozzle 16 of the outer tube 13 by way of the inlet header 8, is subjected to the steam-reforming reaction while passing downwards through the catalyst zone 15 packed between the inner tube 14 and the outer tube 13, enters the inner tube 14 whose bottom opens into the lower end of the reforming tube, ascends inside the inner tube 14, goes out of the reforming tube through the reforming tube outlet nozzle 17 within the upper pressure-chamber 3 of the reformer, is collected into the outlet header 11 through the collecting pipe 10, and goes out of the steam reformer 1 through the nozzle 12.

In order to form a passage for the purpose of heating the reforming tubes by keeping the high-temperature and high-pressure helium gas flowing, the lower pressure-vessel below the tube sheet constitutes the vessel for the high-pressure gas. As to the construction of this pressure vessel, it will do to apply a welded vessel made of metallic material; in case of a large-capacity reformer, however, it is preferable to construct it by applying a steel lining onto the interior of a vessel built of prestressed concrete. In either case, it is advisable to construct said vessel by fixing a heat insulating material (such as ceramic material, rock-wool, graphite mat, heat insulator made of steel, etc.) onto its interior to prevent the high-temperature helium gas from direct contact therewith in order to lower the temperature so as not to deteriorate the strength of the pressure-retaining structure, and further providing a mechanism for safety which functions to watch the rise in temperature by means of a thermo-alarm. The tube sheet constituting a part of the lower pressure-vessel is also provided with an appropriate heat insulating means.

As the material for the outer tube and the inner tube constituting the reforming tube, high nickel-chromium steel tube is employed, and this tube material is desirable to be of thickness capable of resisting the high-temperature and high-pressure helium gas flowing outside of it. The upper pressure-vessel retains a pressure almost equivalent to that of the lower pressure-vessel separated by the tube sheet 2, so that it constitutes a high-pressure gas vessel. The pressure within the upper pressure-vessel can be brought about by introducing air or the like therein through the nozzle 21, but, for safety's sake, it is advisable to employ an inert gas such as nitrogen gas, helium gas, etc. As to the construction of this pressure vessel, it will do to apply a cap-shaped vessel made of steel; in case of a large-capacity reformer, however, it is preferable to construct it by applying a steel lining onto the interior of a vessel built of prestressed concrete and providing a partial opening on the upper part thereof. The upper pressure-vessel is provided with the inlet nozzle for the feed gas and the outlet nozzle for the reformed gas. Its inside is provided with pipe arrangement for the purpose of distribution and collection of gas to and from each reforming tube. Further, it is so constructed and provided with a sufficient space that loading and unloading of reforming catalyst may be made by removing the flange 18 mounted thereon. The tube sheet 2 is of course supposed to hold the weight of the group of reforming tubes (with catalyst packed therein), it also functions to exclude the high-temperature and high-pressure helium gas from the upper pressure-vessel 3 surrounding the upper part of the reforming tubes. Since the high-temperature helium gas is a gas having a pressure of 20 – 60 $kg/cm^2$, in case the tube sheet is flat and is supposed to undergo the high pressure of this helium gas in its entirety, the tube sheet is required to have a considerable thickness. As an alternative, it is conceivable to reinforce the tube sheet 2 with structural materials such as beams, but this measure is undesirable as it requires the provision of extra space for the upper pressure-vessel.

According to the present invention, with a view to avoiding such troubles, the upper pressure-vessel 3 above the tube sheet is also so constructed that it can be closed up and a pressure equivalent to the pressure of helium gas within the lower pressure-vessel can be maintained within the upper pressure-vessel. For instance, the control for equalizing the pressure above and below the tube sheet is performed by means of the control system devised to make the pressure within the upper pressure-vessel follow the pressure of the helium gas within the lower pressure-vessel by the use of a pressure differential detector-regulator. That is, the pressure of the helium gas being introduced through the nozzle 5 is measured, and then nitrogen gas, helium gas or the like is sent in the upper pressure-vessel through the nozzle 21 to see that the upper pressure-vessel maintain a pressure equivalent to the above measured pressure of helium gas. By means of thus maintaining equal pressure for the upper and lower pressure-vessel, the joint of the tube sheet and reforming tube is free from sustaining damage and the leak of helium gas containing nuclear fission product to the upper pressure-vessel can be avoided.

Figure 3:
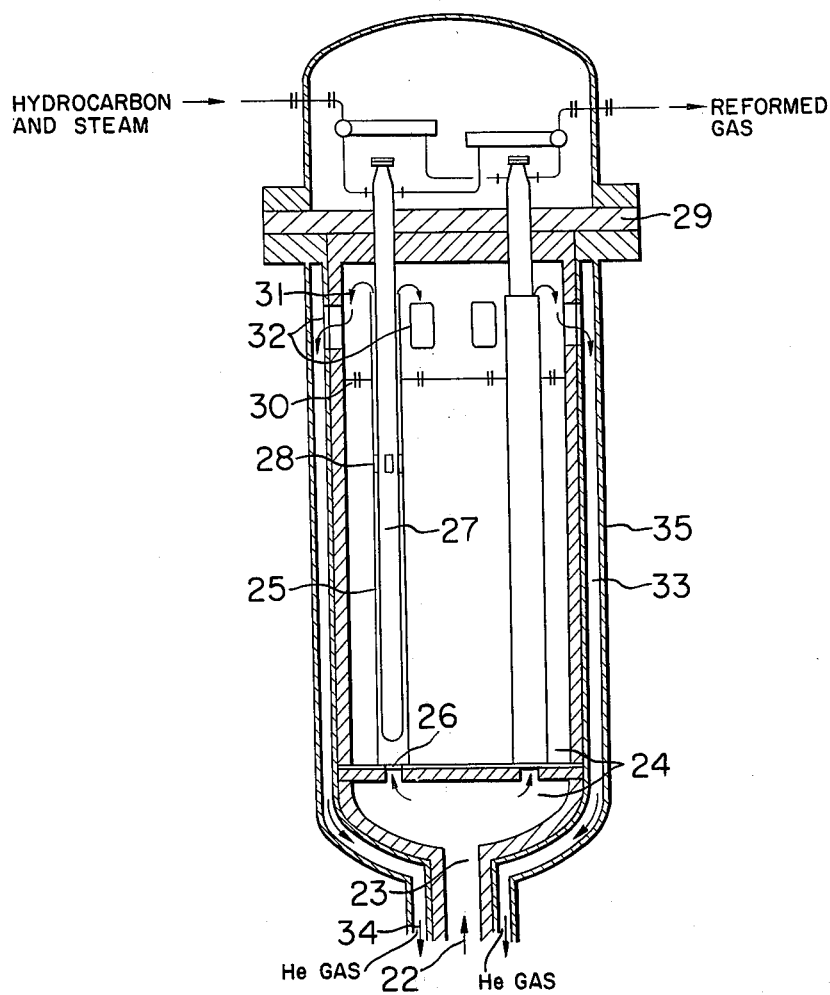
Figure 4:
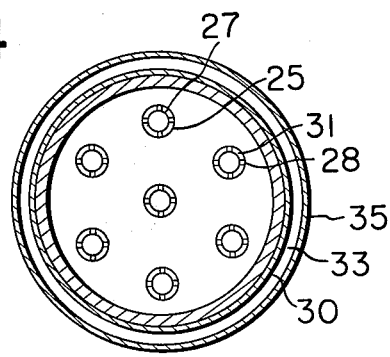

Hereunder will be given elucidation of another mode of practicing the present invention by reference to FIGS. 3 and 4.

A high-temperature and high-pressure helium gas enters the lower pressure-vessel through the line 22. This high-temperature and high-pressure helium gas enters the double-walled lower pressure-vessel 24 through the orifice 23. The reaction tubes within the lower pressure-vessel are respectively covered with the sleeve tube 25. The helium gas enters each sleeve tube as a uniform stream through the restriction orifice 26 provided on the lower part of the sleeve tube, and heats the reforming tube 27 — which is of double-tube construction and is concentric with the sleeve tube 25 — as it ascends. The reforming tube 27 is provided with the spacer 28 for the purpose of keeping it concentric with the sleeve tube 25. Numeral reference 29 denotes the tube sheet which divides the interior of the cylindrical vessel into the upper pressure-vessel and the lower pressure-vessel and also holds the reforming tubes vertically and gastightly. The upper end of the sleeve tube 25 is fixed to the plate 30. The helium gas after heating the reforming tube comes out through the concentric opening between the reforming tube and the sleeve tube, passes through the orifice 32, descends along the inner wall 33 of the lower pressure-vessel, and goes out through the outlet 34. Since the helium gas whose temperature has fallen as a result of serving for heating flows down along the inner wall 33 of the cylindrical vessel 35, it is possible to prevent the cylindrical vessel to maintain the pressure of helium gas from attaining a high temperature. Furthermore, it is possible to minimize the thickness of the layer of heat insulating material to be applied to the interior of the cylindrical vessel.

Besides, another type of steam reformer can be devised by providing tube for the purpose of generating steam on the inner wall 33 of the cylindrical vessel 35 to prevent the rise in temperature of the wall by utilizing said tubes.

The steam-reforming reaction is an intense endothermic reaction such as in the case of methane shown in the following, and, in order to improve the rate of reaction, it is necessary to bring about the highest possible equilibrium temperature (such as 800°C or more).

$$CH_4 + H_2O \rightleftharpoons CO + 3H_2 - 54 \text{ Kcal}$$

$$CH_4 + 2H_2O \rightleftharpoons CO_2 + 4H_2 - 46 \text{ Kcal}$$

$$CH_4 + CO_2 \rightleftharpoons 2CO + 2H_2 - 62 \text{ Kcal}$$

In order to effect these reactions as efficiently as possible, it is necessary to balance the heat flux passing the wall of reforming tube with the quantity of heat being absorbed by the reaction zone.

In case of the steam reformer popular for practical use, the heat flux passing the surface of the reforming tube (with an external diameter of 1.5–8 inches) is said to be in the range of 30,000–60,000 Kcal/m²h. Also in case of heating the reforming tube by means of helium gas having a temperature of about 1,000°C at the inlet, it is desirable to apply a heat flux equivalent to the above from economical point of view, and the present invention renders it possible to attain easily the value of about 40,000 Kcal/m²h. In order to obtain a heat flux of such a high value, it is necessary to take measures for minimizing the heat transfer resistance on the part of helium gas. According to the present invention, there are provided baffle plates, or provided sleeve tubes and, as a means of raising the temperature of the gas to be reformed by the helium gas having a maximum temperature of about 1,000°C, it is devised to effect a counter current flow between the helium gas and the gas to be reformed.

As is clear from the foregoing explanation, it is natural that the steam reformer according to the present invention should be modified with respect to the structural dimension, number and disposition of the reaction tubes depending on the reaction condition such as the properties of catalyst, the composition of gas, etc. which are to be applied. However, inasmuch as the heat necessary for the steam-reforming reaction is supplied from helium gas having a high pressure (about 20–60 Kg/cm²) outside the reforming tube, when the stress arising from the pressure differential acting on the reforming tube is taken into consideration, the pressure for effecting the reforming reaction is desirable to be as high as possible and the pressure of helium gas is desirable to be close to the pressure of the reformed gas.

The present invention renders it possible to utilize directly the primary coolant helium gas of the high-temperature gas cooled reactor as the heat-source, whereby multipurpose utilization of the high-temperature gas cooled reactor can be promoted. Furthermore, in case the nuclear heat energy can be supplied at a price much lower than those of conventional fuels, adoption of the reformer according to the present invention will provide an excellent method of effecting the steam-reforming reaction of hydrocarbons.

What is claimed is:

1. An apparatus for the steam reforming of hydrocarbons, comprising:

an upright hollow casing having a tube sheet extending across the interior of said casing between the upper and lower ends thereof and dividing said casing into an upper closed pressure vessel and a lower closed pressure vessel, said vessels being isolated from each other and connected in gas-tight relationship;

a plurality of vertical reforming tube structures supported on said tube sheet and extending therethrough in gas-tight relationship therewith, said tube sheet being imperforate except where said reforming tube structures extend therethrough, said reforming tube structures each having an upper portion extending upwardly into said upper pressure vessel and a lower portion extending downwardly into said lower pressure vessel, each of said reforming tube structures comprising substantially concentric and spaced-apart inner and outer tubes which tubes are in gas flow communication with each other only at the lower end of said inner tube, and containing a bed of steam reforming catalyst packed in the space between said inner and outer tubes with the lower end of said bed being spaced upwardly from the lower end of said inner tube;

first conduit means in said upper pressure vessel and connected to the upper end of the outer tube of each reforming tube structure for feeding a mixture of hydrocarbon and steam into the upper end of said outer tube, said outer tube being closed except for said first conduit means;

second conduit means in said upper pressure vessel connected to the upper end of the inner tube of each reforming tube structure for discharging from the upper end of said inner tube and thence outwardly from the casing the reformed gas produced by flowing said mixture through said catalyst, said inner tube being closed except for said second conduit means and the communication of the lower end of said inner tube with said outer tube;

means adjacent the lower end of said lower pressure vessel for flowing into said lower vessel a stream of helium gas having a temperature of from about 750° to about 1100°C and a pressure of from about 20 to about 60 kg/cm² and directing same against the lower ends of said reforming tube structures;

baffle means in said lower pressure vessel and associated with the exterior of said reforming tube structures and extending from adjacent the lower ends to adjacent the upper ends of the lower portions of said reforming tube structures for guiding flow of said helium gas upwardly around said reforming tube structures so that said helium gas is effective to heat the contents of said reforming tube structures to the reforming temperature;

means adjacent the upper end of said lower pressure vessel for discharging said helium gas from said lower pressure vessel;

and means for supplying a further pressurized gas into said upper pressure vessel to maintain in said upper vessel a pressure substantially equal to the helium gas pressure in said lower pressure vessel.

2. An apparatus according to claim 1, in which said baffle means comprises a plurality of transversely extending, vertically spaced baffle plates surrounding said reforming tube structures and extending therefrom to the interior wall of said lower pressure vessel, said baffle plates defining passages for upward flow of helium gas with the passages in alternate baffle plates being located on opposite sides of said reforming tube structures and the remainder of said baffle plates being imperforate so that the helium gas flows upwardly through said lower pressure vessel through said passages and the spaces between said baffle plates in a zigzag fashion crossing said reforming tube structures for repeated contact therewith.

3. An apparatus according to claim 1, in which said means for flowing helium gas into the lower end of said lower pressure vessel comprises means defining a separate restriction orifice located below the lower end of each reforming tube structure for directing said helium gas vertically upwardly around said reforming tube structure, said baffle means comprising a separate vertical sleeve tube surrounding each reforming tube structure and closely spaced therefrom, the upper end of said sleeve tube being located close to but spaced vertically downwardly from said tube sheet, the lower end of said sleeve tube surrounding and being sealed with respect to said restriction orifice so that the helium gas flows upwardly through said sleeve tube and in heat transfer relationship with said reforming tube structure.

4. An apparatus according to claim 3, in which said means for discharging said helium gas from said lower pressure vessel comprises means defining a flow passage surrounding the exterior of said lower pressure vessel and extending substantially to the bottom thereof.

5. An apparatus according to claim 1, in which each reforming tube structure has a removable flanged cover at its upper end.

6. An apparatus according to claim 1, including a pressure detector for detecting the pressure of said helium gas in said lower vessel and for adjusting the pressure of said further gas in said upper vessel in response to the pressure of said helium gas in said lower vessel.

* * * * *